United States Patent [19]

Lexen

[11] Patent Number: 4,813,510

[45] Date of Patent: Mar. 21, 1989

[54] MOTOR VEHICLE

[75] Inventor: Gerald Lexen, Munich, Fed. Rep. of Germany

[73] Assignee: MAN Nutzfahrzeuge GmbH, Munich, Fed. Rep. of Germany

[21] Appl. No.: 53,959

[22] Filed: May 22, 1987

[30] Foreign Application Priority Data

Jun. 6, 1986 [DE] Fed. Rep. of Germany ....... 3619187

[51] Int. Cl.[4] .............................................. B60K 9/00
[52] U.S. Cl. ..................................... 180/165; 180/307; 60/414; 73/510
[58] Field of Search ...................... 180/65.2, 165, 307; 60/408, 413, 414, 415, 418, 687; 74/720, 730, 732; 73/510, 521, 524

[56] References Cited

U.S. PATENT DOCUMENTS

| | | | |
|---|---|---|---|
| 2,755,898 | 7/1956 | Bell | 60/414 |
| 3,892,283 | 7/1975 | Johnson | 180/307 |
| 4,098,144 | 7/1978 | Besel et al. | 180/165 |
| 4,132,283 | 1/1979 | McCurry | 180/165 |
| 4,215,545 | 8/1980 | Morello et al. | 60/414 |
| 4,227,587 | 10/1980 | Carman | 180/165 |
| 4,350,220 | 9/1982 | Carman | 180/165 |
| 4,351,409 | 9/1982 | Malik | 180/165 |
| 4,372,414 | 2/1983 | Anderson et al. | 180/165 |
| 4,674,280 | 6/1987 | Stuhr | 180/165 |

FOREIGN PATENT DOCUMENTS 2625748 12/1977 Fed. Rep. of Germany ........ 60/413

OTHER PUBLICATIONS

Automobil-Revue, Technical Journal, No. 20, May 15, 1986, pp. 69 and 71.

*Primary Examiner*—David M. Mitchell
*Assistant Examiner*—Brian L. Johnson
*Attorney, Agent, or Firm*—Scully, Scott, Murphy & Presser

[57] ABSTRACT

A motor vehicle which is more particularly adapted for stop and go traffic conditions such as a city omnibus plying on a regular service, a garbage collection vehicle or the like has a drive arrangement including a driven rear axle connected with an IC engine and a variable speed transmission, is fitted with a braking energy recovery means in the form of a self-contained system which is only connected with the variable speed transmission for charging and discharging of a high pressure accumulator. This coupling operation is performed by a clutch operated in accordance with certain operating conditions. One side of the clutch is joined to a secondary output of the variable speed transmission and the other side is connected with the drive shaft of a hydraulic transducer, of which only one is required. Owing to the fact that the braking energy recover means may be switched off smooth and trouble-free operation of the motor vehicle is possible using its normal drive means even if the braking energy recovery means is defective or has a faulty function.

10 Claims, 9 Drawing Sheets

MOTOR VEHICLE

BACKGROUND OF THE INVENTION

1. Field of the Invention

The invention relates to motor vehicles, more especially a commercial vehicle of the type designed for stop and go operation such as buses on city street traffic, a garbage collection truck or the like, which includes a drive arrangement for the rear axle, consisting of an internal combustion engine whose output is connected with a variable speed transmission, especially an automatic transmission, and with brake energy recovery means encompassing a hydraulic oil tank, a hydraulic suction pump connected therewith, a high pressure hydraulic accumulator, a low pressure hydraulic accumulator, at least one hydraulic energy transducer which is selectively operable as a motor or as a pump, as well as hydraulic and electrical control means for controlling the charging and discharging sequences of the high pressure hydraulic accumulator.

2. Discussion of the Prior Art

A vehicle of this type is known from the description thereof in the German periodical "o+p, Oelhydraulik+Pneumatic", 22 (1976), No. 4, pages 195 to 199. In that instance, the drive arrangement for the rear axle and the device for the hydrostatic brake energy recovery are combined into a common hydraulic system, whereby an auxiliary drive is interposed between the hydrostatic transducer and the variable speed transmission, such auxiliary drive train being permanently connected; meaning, not being switchable. However, besides having the advantage in that this overall arrangement is compact, this possesses the disadvantage that upon the failure of one of the components, both systems are either impaired in their function, or may even become completely inoperative.

SUMMARY OF THE INVENTION

Accordingly, it is an object of the present invention, that for a motor vehicle of the above-mentioned type, the drive arrangement and the device for the hydrostatic recovery of braking energy are constructed in such a manner, as to render possible the operation of the vehicle even upon the failure or malfunctioning of any component of the brake energy recovery system.

In order to achieve the foregoing and other objects of the invention, the brake energy recovery system is constructed as a self-contained or autonomous system which is only operatively connected, as needed, for the charging and discharging sequences of the high pressure accumulator of the drive arrangement by means of a clutch actuatable in dependence upon certain operating conditions. One side of the clutch is connected with a secondary output of the variable speed transmission, and the other side thereof is connected with the drive shaft of the single hydraulic transducer.

Through the capability of a complete separation of the hydrostatic braking energy recovery means from the drive arrangement for the vehicle, there is fulfilled the purpose of the invention. The vehicle is even operable in the presence of malfunctions in the accumulator system, irrespective as to whether on the hydraulic side or on the electronic side. On the other hand, the brake energy recovery system is always connectable by means of the clutch, for the charging or discharging sequences of the high pressure accumulator, with the rear axle drive train, when this is permitted by certain operating conditions. As a result thereof, achieved is a braking energy recovery and an introduction of stored energy to the rear axle drive train which is optimally correlated with the vehicle operation.

In accordance with the foregoing, the fact is derived that the braking energy recovery system provides for a modular control arrangement, which is extremely advantageous in that each of the individual modules, based on any kind of reason, may as necessary be quickly and simply exchanged. This substantially reduces the cost of stocking spare parts and reduces the cost for replacement parts. Furthermore, this modular construction facilitates, in an advantageous manner, the arrangement of the individual modules in the most expedient locations on the vehicle. Such a flexibility in the assembling and arrangement thereof would not be possible with a larger grouping of components.

BRIEF DESCRIPTION OF THE DRAWINGS

Reference may now be had to the following detailed description of the invention, taken in conjunction with the accompanying drawings; in which.

DETAILED DESCRIPTION OF PREFERRED EMBODIMENTS OF THE INVENTION

Figure 1:
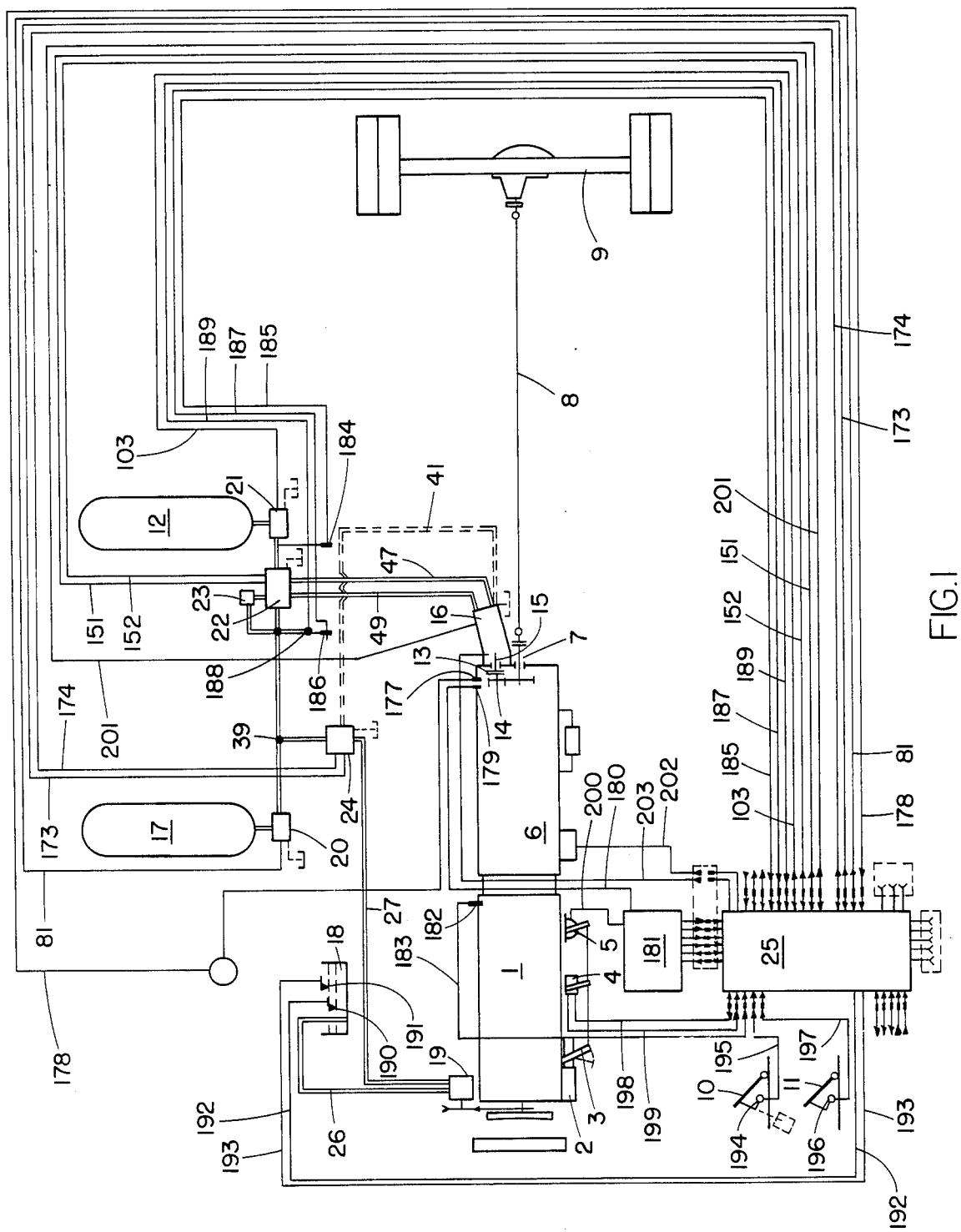
FIG. 1 illustrates a schematic block diagram of the drive arrangement of a motor vehicle and the entire braking energy recovery system pursuant to a first embodiment of the invention.

The recovery of energy which is released upon braking is considered especially advantageous in the case of vehicles employed in stop-and-go traffic, such as buses operating in city traffic, and garbage collection vehicles because of the frequent starting and braking sequences. For this purpose, a brake energy recovery system is provided on the vehicle, which renders it possible to hydrostatically convert the energy released on braking, such that the energy can be temporarily stored and then rendered available when the vehicle is again started. Details of such braking energy recovery means are described hereinbelow on the basis of the accompanying drawings.

In the figures only such portions of the vehicle are shown as are necessary for an understanding of the invention. An internal combustion engine 1 includes an injection pump 2, whose control rod 3 is actuated by an electrical servomotor 4. Moreover, the control rod 3 is connected with electrical position sensors 5; for instance, such as potentiometers. The engine 1 has the output shaft thereof connected with a variable speed transmission 6, which in particular, may be an automatic transmission. The primary output 7 of the variable speed transmission 6 is connected with the drive train 8 of the rear axle 9 of the motor vehicle. Reference numeral 10 denotes the brake pedal, and numeral 11 denotes an accelerator pedal, both of which are located in front of the driver seat.

The brake energy recovery system is a self-contained system which is only switched into operation, and connected with the variable speed transmission 67, when it is required for the charging and discharging of a high pressure accumulator 12 though the intermediary of a clutch 13, the latter of which is actuated during certain conditions of operation of the motor vehicle. One side of the clutch 13 is connected with a secondary output 14 of the variable speed transmission 6, and the other side thereof is connected with the drive shaft 15 of a hydraulic transducer 16, only one such transducer being required in the present embodiment. The hydraulic transducer 16 is adjustable and may be selectively operated as a motor or as a pump, as required at any given instance. The mode of operation of the transducer 16 is changed by adjusting the rocking angle thereof; whereas the direction of rotation of the hydraulic transducer 16 remains the same under all conditions of operation. The hydraulic transducer 16 may be of a commercially available design, such as an oblique shaft pump, a swash plate pump or a radial piston pump. In this case of the embodiment pursuant to FIGS. 1 to 7 the hydraulic transducer 16 may be adjustable between zero and a maximum setting. For switching over its mode of operation by varying the rocking or setting angle to change over between pumping and operation as a motor there is a switchover or control block 22. In the working example in accordance with FIGS. 8 and 9 the hydraulic transducer 16 may be switched over by varying the angle of rock from a positive setting (+) through a neutral setting into a negative setting (−). As a result, the switchover or control block 22 is not needed in this instance. All the other components are the same for the two embodiments.

A further portion of the brake energy recovery system is a low pressure accumulator 17. The latter accumulator 17, and also the high pressure accumulator 12, are each preferably in the form of a bladder accumulator or a piston accumulator of known construction.

The brake energy recovery system further comprises a hydraulic oil tank 18 and a feed pump 19 which is driven by the internal combustion engine 1 for supplying the hydraulic components. A further portion of the brake energy recovery system is a modularly constructed controller, which is constituted of electrohydraulic and electronic groups of operational components. Each such assembly forms a module which is connected with one or more modules in correspondence with its functions.

In detail, the modules are as generally follows; such as a control block 20 which is connected with the low pressure hydraulic accumulator 17, a control block 21 for the high pressure accumulator 12, a switchover block 22, which is only necessary for the embodiment of the invention pursuant to FIGS. 1 through 7, for the hydraulic transducer 16 in order to switch the latter between pump and motor operation, a pressure limiting unit 23, an oil feed block 24 and a lead computer 25.

The computer 25 is formed by a microprocessor having input and output units associated therewith. Details in regard therewith as set forth hereinbelow.

Figure 2:
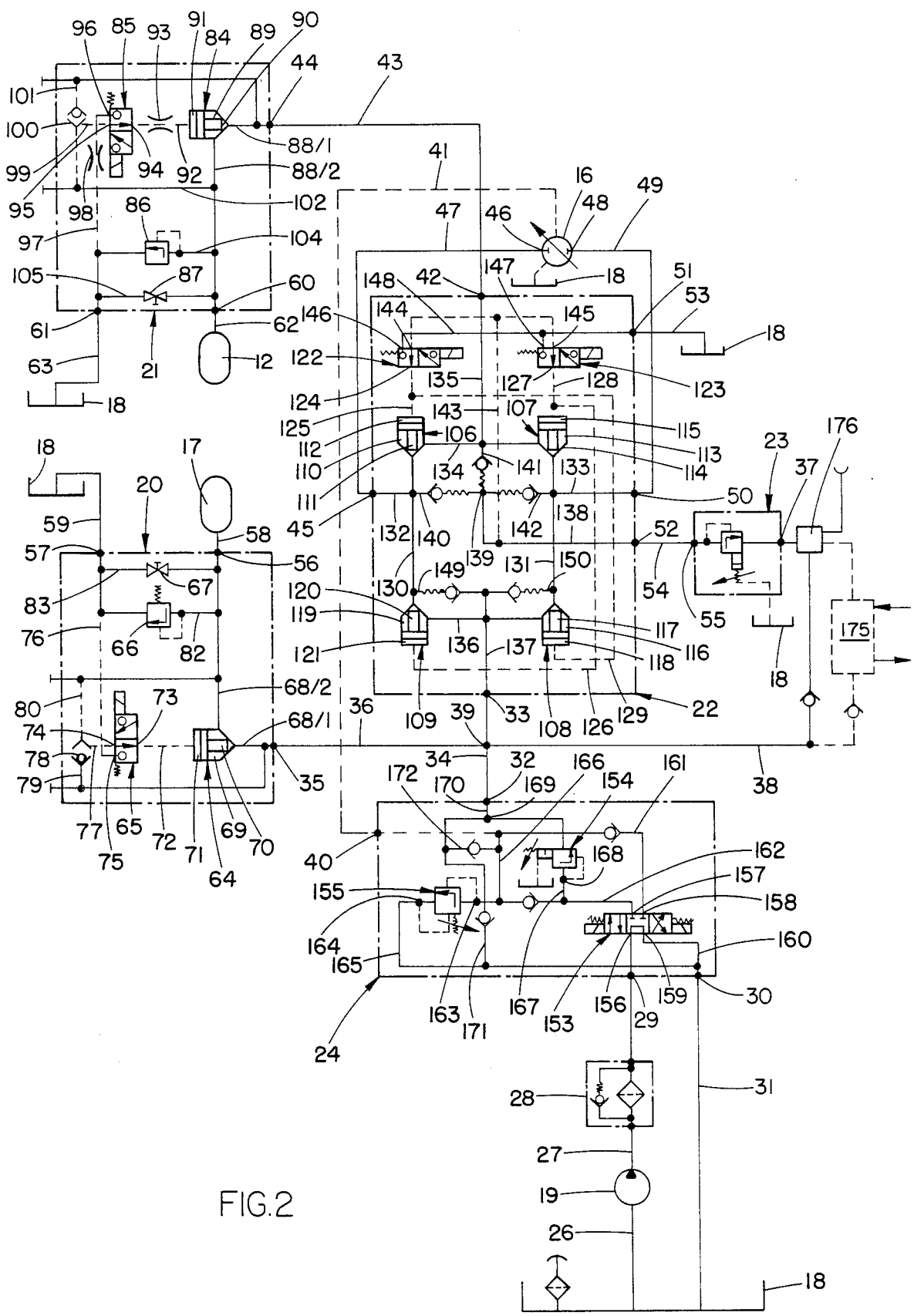
FIG. 2 illustrates a schematic block diagram of the hydraulic portion of the braking energy recovery system pursuant to FIG. 1.

The following description relates to details of the modules shown in FIG. 2, and their operative interrelationship, which form the hydraulic portion of the brake energy recovery system.

Figure 8:
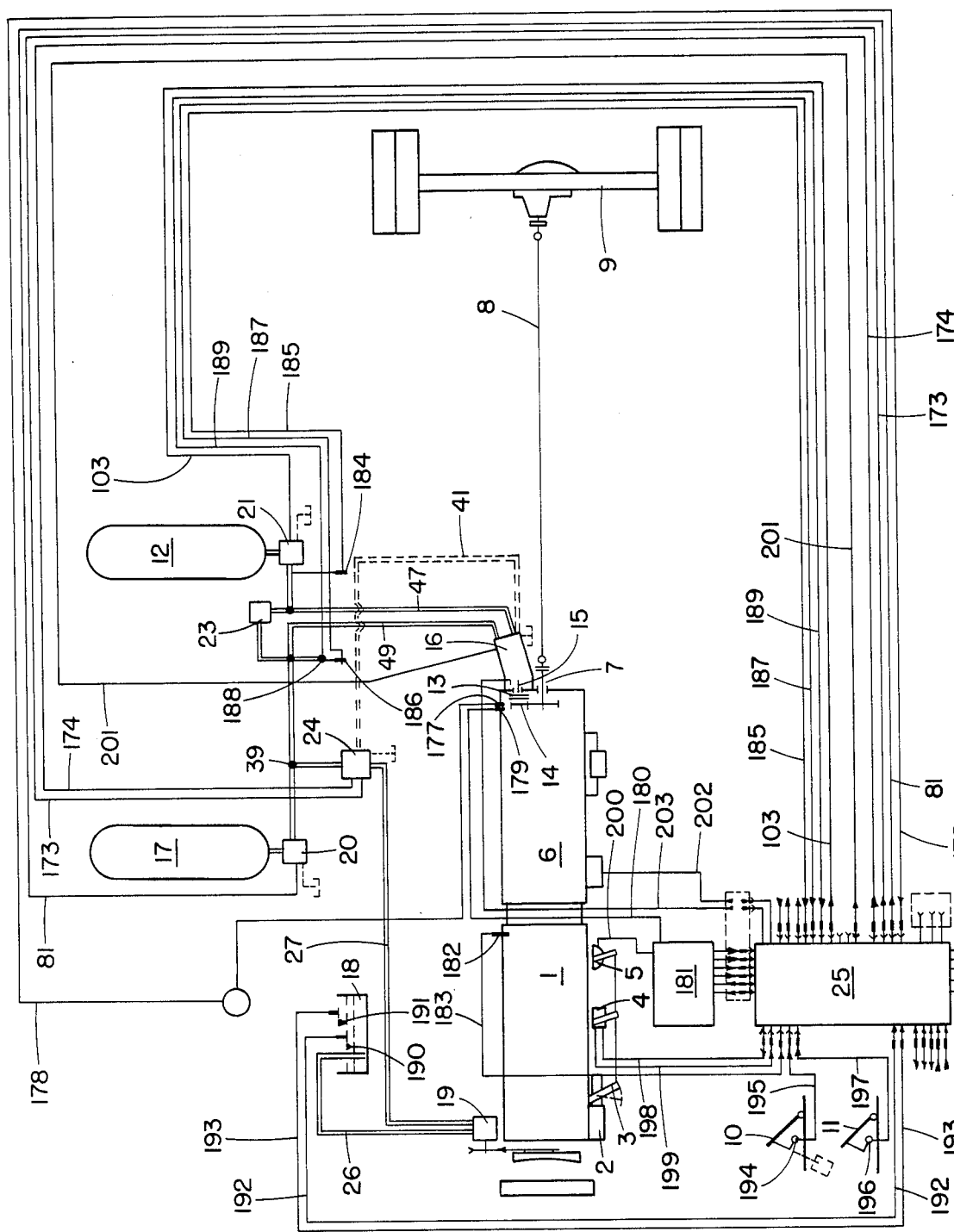
FIG. 8 illustrates a schematic block diagram of the drive arrangement for a motor vehicle and the entire brake energy recovery system pursuant to a second embodiment of the invention.
Figure 9:
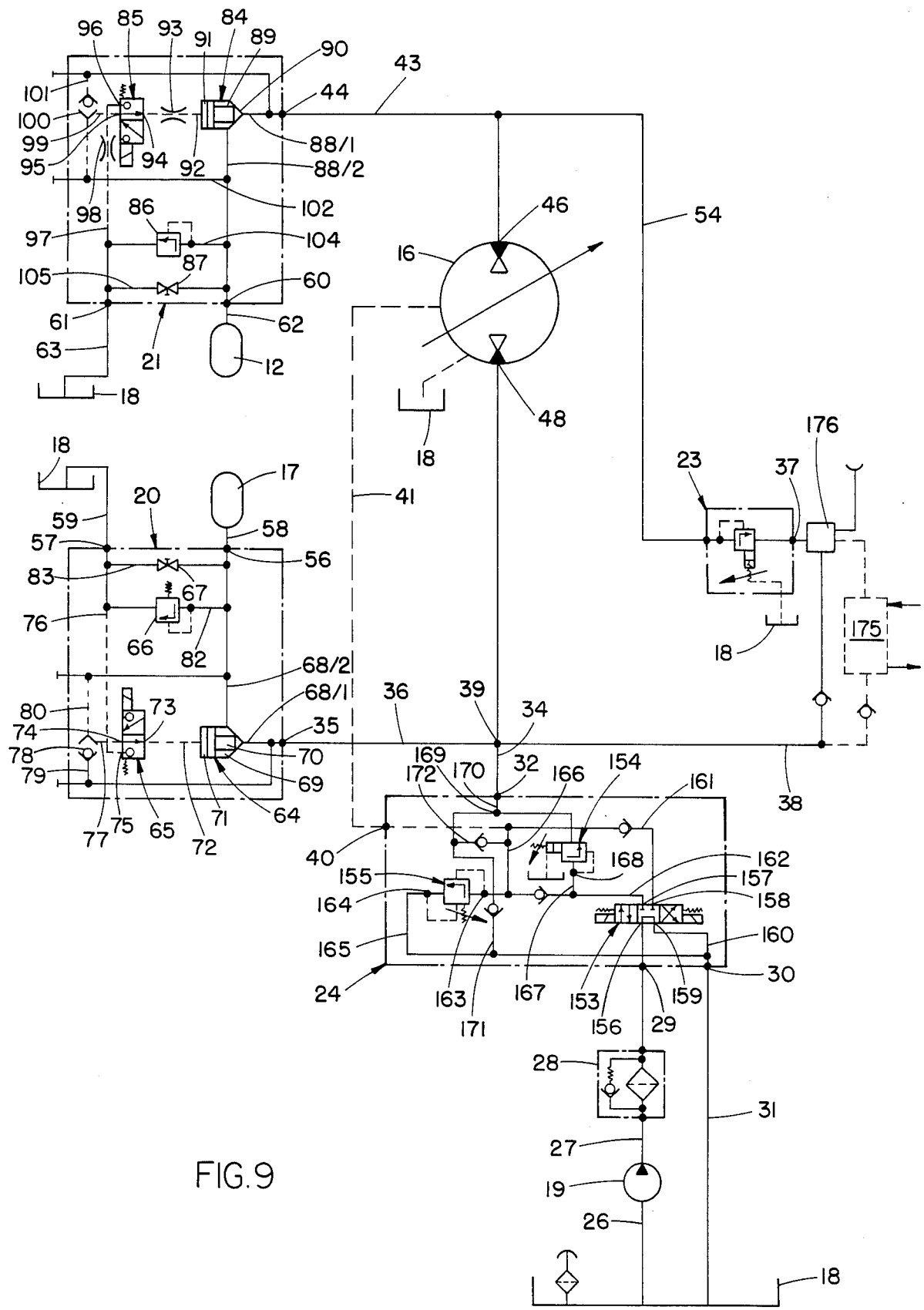
FIG. 9 illustrates a schematic circuit diagram of the hydraulic portion of the brake energy recovery system pursuant to FIG. 8.

The feed pump 19 is connected through a suction line 26 with the hydraulic tank 18, and feeds hydraulic oil through a pressure line 27 having a pressure filter 28 therein to the input 29 of the oil feed block 24. The relief output 30 of the latter is connected through a return line 31 with the hydraulic oil tank. The oil feed output 32 of the oil feed block, in the case of the embodiment of FIGS. 1 through 7, is connected with the input 33 of the switch over block 22, and in the case of the embodiment of FIGS. 8 and 9 is connected with the one input 48 of two inputs 46 and 48 of the hydraulic transducer 16 that is able be adjusted from positive (+) to negative (−). The line 36 branches from the line 34 to the input 35 of the control block 20, and a relief line 38 extends from the output 37 of the pressure limiting unit 23 into the line 34, for which purpose there is preferably provided a branching point at 39. The control output 40 of the oil feed block 24 is connected through a control pressure line 41 with the hydraulic transducer 16; in essence, with the hydraulic setting portions thereof for causing a change in the setting or rocking angle.

The high pressure port 42 of the switchover block 22 is connected through a pressure line 43 with the high pressure port 44 of the control block 21. In the case of the embodiment of the invention pursuant to FIGS. 8 and 9, the line 43 is connected with the input 46 of the hdyraulic transducer 16. This line 43 also branches through a relief line 54 to the pressure limiting unit 23. The power output 45 of the switchover block 22 is connected with the power input 46 of the hydraulic transducer 16 through line 47, whereas the power output 48 of the hydraulic transducer 16 connects with the power input 50 of the switchover block 22 through a feed line 49. Furthermore, the switchover block 22 has two relief outputs 51 and 52, of which one output 51 connects through a relief line 53 with the hydraulic oil tank 18 and the other one output 52 connects through a relief line 54 with the input 55 of the pressure limiting unit 23. The latter consists of a pressure limiting valve, which is set to the pressure corresponding to the desired or possible maximum pressure in the high pressure accumulator 12. In effect, oil at higher pressures is diverted to the hydraulic oil tank 18 as a part of the control function.

In addition to the low pressure port 35, the control block 20 for the low pressure accumulator 17 has two further ports 56 and 57, of which the port 56 connects through a line 58 with the low pressure accumulator 17 and the port 57 is connected with the hydraulic oil tank 18 through a relief line 59.

The control block 21 for the high pressure accumulator 12 is similar in construction to that of the control block 20. In addition to its high pressure port 44, the control block 21 has two further ports 60 and 61 of which the port 60 is connected through a pressure line 62 with the high pressure accumulator 12 and the port 61 connects with the hydraulic oil tank 18 through a relief line 63.

In a more detailed consideration of the control block 20, it can be ascertained that the latter possesses a shut-off valve 64 providing for two settings, i.e. either fully closed or fully open, an electronically operated 3/2-way valve 65 associated with the valve 64 and which is arranged in a hydraulic circuit, a pressure limiting valve 66 and a choke 67 that may be shut for opening and closing, in a suitably controlled manner. The valve 64 serves to control the flow through a line 68 consisting of two parts 68/1 and 68/2, and which extends between the ports 35 and 56. The valve 64 opens and closes by employing a valve member 70 operating in a passage 69. A pressure space 71 is provided for the valve member 70, such that when pressure is applied the valve member is moved in a closing direction, Pressurization and relief of pressure is effected through a connecting line 72 between the pressure space 71 and the output port 73 of the 3/2-way valve 65 and, dependent on the switching position, through the pressure input port 74 and the pressure relief port 75. The latter connects through a relief line 76 leading to the port 57 with the hydraulic oil tank 18. The hydraulic control pressure at the pressure input port 74 results from the hydraulic control circuit, the pressure input port 74 connecting through a feed line 77 with the output of a switch-over valve 78, whose one input is connected through a feed duct 79 with the part 68/1, located upstream from the shut off valve 64, of the lie 68, and whose other input is connected with the part 68/2 downstream from the shut off valve 64 through a feed line 80. The 3/2-way valve 65 is operated by the lead computer 25 through a suitable electrical operating line 81 (FIG. 1). The pressure limiting valve 66 is located in a connecting line 82, which extends between the relief line 76 and the part 68/2, which is downstream from the shut off valve 64 of the line 68. A further line 83 extends in parallel with the shut-off choke 67. The pressure limiting valve 66 is set to a pressure which represents the desired maximum pressure in the low pressure accumulator 17. With the aid of the normally closed choke 67, it is possible to effectuate relief of the low pressure accumulator 17. In this respect, for example, in the case of repair operations, full opening may be implemented in order to drain off oil from the low pressure accumulator 17 and from all line 68/1, 80, 82 and 83 downstream of the shut-off valve 64 into hydraulic tank 18.

Concerning the components of the control block 21, the latter is similar in construction to the control block 20, but it is adapted to control higher pressures. The control block thus also includes a shut-off valve 84, a 3/2-way valve 85 for the latter, which is electrically operated and is also located in a hydraulic control circuit, a pressure limiting valve 86 and a shut-off choke 87. In this case the shut-off valve 84 serves for closing and opening of a pressure line 88 extending between the ports 44 and 60, such line having portions 88/1 and 88/2, and whose opening and closing is, in this case, caused as well by a valve member 90 operating in a passage 89 and having a pressure space 91 which may be operated in the closing direction by the application of pressure. Pressurization and relief of pressure take place through a connecting line 92 with a choke 93 therein between the pressure space 91 and the output port 94 of the 3/2-way valve 85, and depending upon the respective setting thereof, there is formed a connection through its pressure input port 95 and its pressure relief port 96. The latter connects through a relief line 97 with the port 61 and thus as well with the hydraulic oil tank 18.

A choke 98 is provided in the relief line 97. The hydraulic control pressure at the pressure input port 95 results in this case from the hydraulic control circuit within the control block, the pressure input port 95 being connected through a feed line 99 with the output of a switch over valve 100, whose one input is connected through a feed line 101 with the portion 88/1 of the line 88 upstream from the shut-off valve 84, and whose other input is connected with portion 88/2 of the line 88 downstream from the shut-off valve 84 through a feed line 102. The 3/2-way valve 85 is also operated by the computer 25 through a suitable electrical operating line 103, as shown in FIG. 1. The pressure limiting valve 86 is located in a connecting line 104, which is arranged between the relief line 97 and the portion 88/2 of the line 88 entering downstream of the shut-off valve 84. Parallel therewith is a line 105 which, in this case, also connects with the shut off choke 87. In this embodiment of the invention, the pressure limiting valve 86 is set to a pressure which corresponds to the permissible maximum pressure in the high pressure accumulator 12. Accordingly, oil is returned at a higher pressure to the hydraulic oil tank 18. The shut-off choke 87, which is normally closed, functions to drain the high pressure accumulator 12; in this respect, if the valve is fully opened it is possible for oil to be drained from the high pressure accumulator 12 and all lines 88/2, 102, 104 and 97 downstream of the shut off valve 84, whereby such oil also returns to the hydraulic oil tank 18.

The switchover block 22 for the hydraulic transducer 16 includes four paired electronically and hydraulically operated shut-off valves 106, 107, 108 and 109. Each of the four shut-off valves has a valve member operating in a passage and a pressure space for pressurization and pressure relief. The passage of the shut-off valve 106 is dented by 110, its valve member is denoted by 11 and its pressure space is denoted by 112. The shut-off valve 107 has a passage 113, a valve member 114 and a pressure space 115. In the case of the shut off valve 108, the valve passage is denoted by 116, its valve member by 117 and its pressure space by 118. In the case of the shut-off valve 109 the valve passage is denoted by 119, the valve member is denoted by 120 and the pressure space is denoted by 121. For the paired operation of the shut-off valves there are provided two 3/2-way valves 122 and 123. The output port 124 of the 3/2-way valve 122 is connected through a connecting line 125 with the pressure space 112 of the shut-off valve 106, and through a connecting line 129 with the pressure space 118 of the shut-off valve 108. On the other hand, the output port 127 of the 3/2-way valve 123 is connected through a connecting line 128 with the pressure space 115 of the shut-off valve 107 and through a connecting line 126 with the pressure space 121 of the shut-off valve 109. Furthermore, the input ports, which may be closed, of the two shut off valves 106 and 109 are connected together through a line 130, while the input ports, which may be closed, of the two shut-off valves 107 and 108 are connected together through a line 131. The line 130 is connected by a branch line 132 with the power output 45 of the switch-over block 22, and thus through the lie 47 with the power input 46 of the hydraulic transducer 16. The line 131 is connected through a branch line 133 with the power input 50 o the switch over block 22, and thus through the supply duct 49 with the power output 48 of the hydraulic transducer 16. Furthermore, the passages 110 and 113 of the two shut-off valves 106 and 107 are connected with each other other a line 134. A branch 135 from this line 134 leads to the high pressure port 42 of the switch over block 22, and there is thus formed a connection through the pressure line 43 with the control block 21 and the hydraulic transducer 12 connected with the former. A further line 136 joins the passages 116 and 119 of the two shut-off valves 108 and 109.

The line 136 is connected through a branch line 137 with the operating input 33 of the switch over block 22, and thus with the oil feed block 24 and the control block 20. Furthermore, the control block is internally provided with a line 138 leading to the relief output 52. Opening into this line 138 are three turn-off lines 140, 141 and 142 branching from the lines 130, 131 and 134. In each of such lines there is provided a check valve so that fluid is only able to pass along such lines to the location of connection 139. It is from this line 138 that the two 3/2-way valves 122 and 123 are provided with hydraulic pressure liquid, in effect, through a pressure line 143 which has two branches, of which one leads to the pressure input port 144 of the 3/2-way valve 122 and the other leads to the pressure input port 145 of the 3/2-way valve 123. The pressure relief port 147 of the 3/2valve 122 and the pressure relief port 147 of the 3/2-way valve 123 are connected by way of a common relief line 148 with the relief port 51 of the switch over block 22 so that they are connected with the hydraulic oil tank 18. Furthermore, the line 136 is connected with the two lines 130 and 131 through turn-off lines 149 and 150, the latter lines having check valves therein allowing fluid flow only towards the lines 130 and 131.

The two 3/2-valves 122 and 123 are respectively connected through an operating line 151 and 152 (FIG. 1) with the computer 25. The operating lines 151 and 152 are not provided in the embodiment of FIGS. 8 and 9.

The oil feed block 24 has an electrically operated 4/3-way valve 153, a pressure turn-on valve 154 and a low pressure limiting valve 155. The 4/3-way valve 153 has an input port 156 which is connected with the input 29 of the oil feed block 24, and three output ports; namely, a first pressure outlet port 157, a second pressure output port 158, and a relief output port 159. The port 159 is connected with the relief output 30 of the oil feed block 24 through a duct 160. The second pressure output port 158 is connected through a line 161 (which includes a check valve only allowing flow in the direction of pumping) wit the operating output 40 of the oil feed block. The first outlet port 157, on the other hand, is connected through a line 162, in which there is again provided a check valve allowing flow in only the pumping direction, with the input 163 of the low pressure limiting valve 155, whose output 164 is, in turn, connected through a line 165 with the relief output 30 of the oil feed block 24. Between the two lines 161 and 162 there is a flow path, in each case downstream from the check valve, in the form of a line 166; furthermore the portion of the line 162 which is upsteam of the check valve is connected through a feed line 167 with the input 168 of the pressure turn-on valve 154, whose output 169 is connected through a duct 170 with the oil feed output 32 of the oil feed block 24. Furthermore, a line 171 branches off from the line 165, and only allows flow towards the duct 170 due to the presence of the check valve in the line 171. Between the line 172 and the line 166, the line 172 is equipped with a check valve allowing flow in only this direction, i.e. towards the line 166. The 4/3-way valve 153 has three operational states; on one hand, a first state in which there is a direct connection between the ports 156 and 157, and the ports 158 and 159; on another hand, a second state in which the two ports 156 and 159 are bypassed; and a third state, in which the ports 156 and 158, on the one hand, and the ports 157 and 159, on the other hand, are joined with each other. The two electrical operating devices for the 4/3-way valve are, in this case, connected through, respectively, an operating line 173 and 174 (FIG. 1) with the computer 25. The manner of operation of the oil feed block 24 is described infra with reference to the FIGS. 5 through 7.

Provided is a heat exchanger 175 and a two-way switch 176, by means of which the relief line 38 may be selectively connected so as to lead into or to bypass the heat exchanger 175. The state in which fluid is passed through the heat exchanger 175 is only contemplated for use in the retarder mode, and may be included as portion of a braking energy recovery system, details of this possibility being set forth hereinbelow.

The computer 25 is used with a program for the charging and discharging operations of the high pressure accumulator 12 in response to operating data supplied thereto by sensors with the conductance of signals to the electrical actuators of the clutch 13 and the valves 65, 85, 122, 123 and 153 in the function-specific (i.e. single-function) blocks 20, 21, 22 and 24. At least the following sensors are provided for the control in regard thereto:

(a) One sensor 177 which detects the speed of the drive axle 15 and transmits it through a data line 178 to the computer 25.

(b) One sensor 179 which detects the speed of the secondary output drive 14 and transmits it through a data line 180 to drive electronic circuitry 181 which is connected with the computer.

(c) One sensor 182 which detects the speed of the IC engine 1 and transmits it through a data line 183 to the computer 25.

(d) One pressure sensor 184 which detects the high hydraulic pressure and transits such value to the computer 25 through a data line 185.

(e) One sensor 186 which internally detects the low pressure in the system and transmits such value through a data line 187 to the computer 25.

(f) One temperature pick up 188 to detect the temperature of the low pressure part of the system downstream from the pressure limiting unit 23 and to transit such value through a data line 189 to the computer 25.

(g) One minimum level pickup 190 and a maximum level pickup 191 in the hydraulic tank 18 which supply data with respect to such levels through respective data lines 192 and 193.

A pickup or sensor 194 is connected with the brake pedal 10 in order to supply a pedal position signal through a data line 195 to the computer 25. Simultaneously the accelerator pedal 11 has a pickup 196 which supplies a pedal position signal to the computer through a data line 197. Furthermore, the computer 25 is connected with the actuator 4 for the control rod 3 of the injection pump; this actuator 4 receives its drive signals through the operating line 198 and feeds back the detected actual positions through the data line 199 to the computer 25. The potentiometer 5 supplies signals for the setting of the control rod 3 through the data line 200 to the electronic drive controller 181.

The computer 25 is further connected through a control line 201 with the device for setting the angle of the hydraulic transducer 16. Furthermore, the computer 25 is connected through the operating line 202 for supplying control signals for the setting of the variable speed transmission 6 and for supplying, through the operating line 203, control signals for the operation of the clutch 13.

The computer 25 is further able to be supplied with actual values relating to the state of operation as supplied by sensors, and which is not explained herein in any detail. Since these signals are not absolutely essential for an understanding of the invention, they are not specified herein.

Figure 3:
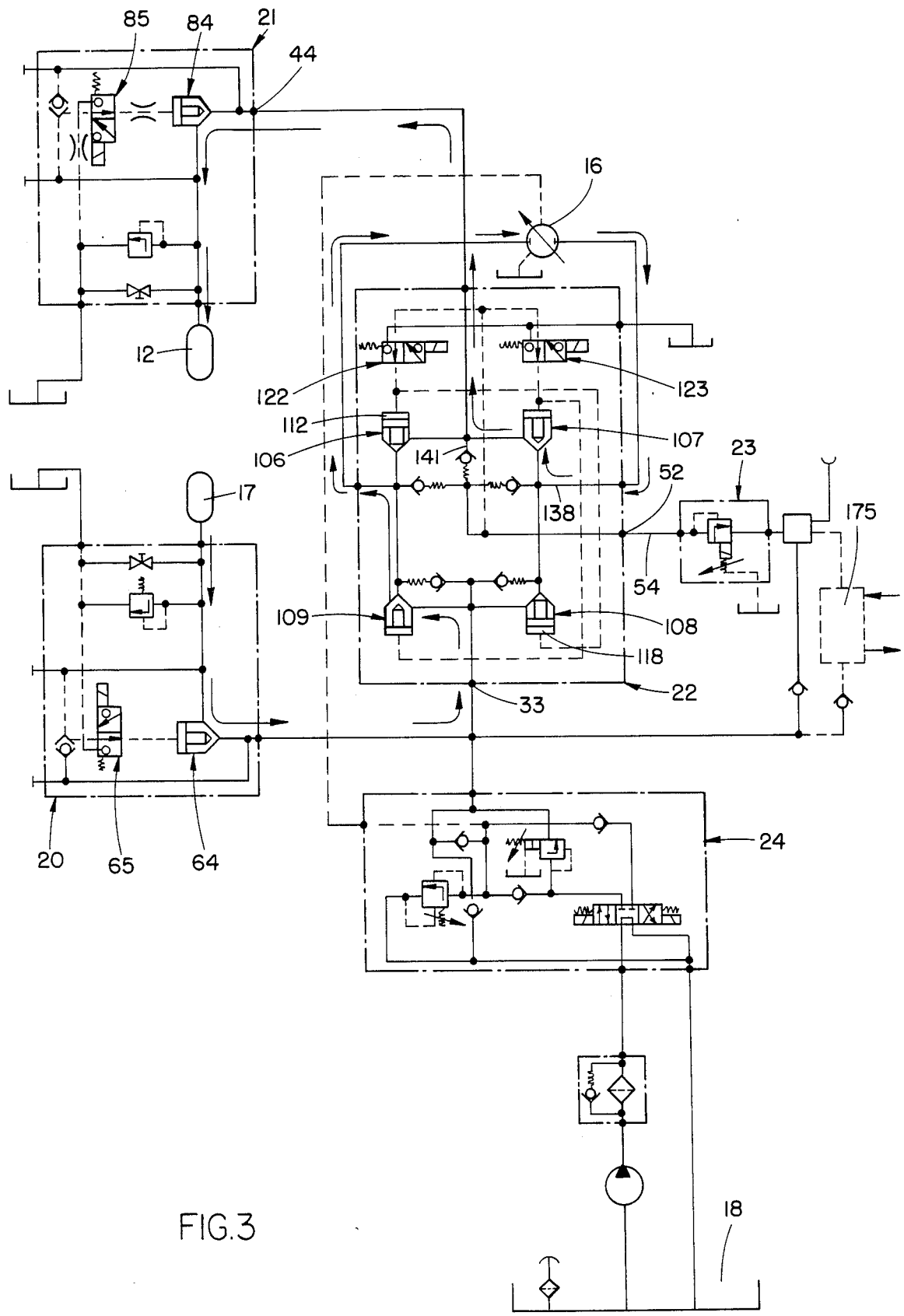
FIG. 3 illustrates the schematic block diagram of FIG. 2 in an operating condition of the components thereof switched to "braking with energy storage"

Following is a a description of the brake energy recovery system of the invention in more specific detail. Referring to FIG. 3, a description will first be provided for the operation of "braking with storage of energy", while with reference to FIG. 4 describes the operation of "driving away and accelerating using energy from the accumulator". For the sake of simplicity, in FIGS. 3 and 4 only those reference numerals have been included which are absolutely necessary for an understanding of the invention.

On braking the motor, there is released vehicle energy. The kinetic energy of the moving vehicle is converted into potential energy and is intermediately stored in the high pressure accumulator 12. If the accumulator 12 is not yet at its permissible maximum pressure, the computer, which will have received accumulator pressure data relating to this condition, will supply control signals to the means connected therewith so that, firstly, the clutch 13 will be connected such that the brake energy recovery system will be drivingly connected with the rear axle drive train 8. At a different time, or at the same point in time as this operation in the system of FIGS. 1 through 7, control pulses will be supplied by the computer 25 to the two 3/2-way valves 122 and 123 in the switch-over block 22, so that these after the 3/2-way valve 122 will be in a condition in which pressure will be applied in the pressure chambers 112 and 118 of the two connected shut-off valves 106 and 108, and these valves will consequently be in the closed state, while the 3/2-way valve 123 will be in a state in which the pressure spaces of the two connected shut-off valve 107 and 109 will be depressurized such that the valves 107 and 109 will be opened. In the case of the embodiment of FIGS. 8 and 9, control signals will emit from the computer 25 to cause a suitable modification in the angle of rock or setting of the hydraulic transducer 16. Subsequently, or simultaneously with this operation, the 3/2-way valve 65 in the control block 20 is moved into such a state that the pressure space of the shut-off valve 64 connected therewith will be depressurized and valve 64 will accordingly be opened. From this point in time forward, it is possible for oil to be pumped by the hydraulic transducer 16, operating as a pump during braking, from the low pressure accumulator 17 to the control block 21. As soon as a pressure is reached at the high pressure port 44 which is at least equal the pressure in the high pressure accumulator 12, the computer 25 being informed of this condition, the computer operates the 3/2-way valve 85 such that the pressure space of the connected shut off valve 84 is depressurized and the valve 84 is accordingly opened. It is then possible for the amount of oil fed by the hydraulic transducer 16 to be supplied to the high pressure accumulator 12. The flow of oil is indicated in FIG. 3 by arrows. In the event of the pressure in the pumping path, which is now opened, exceeding a level set in the pressure limiting unit 23, oil is switched to flow through the lines 141 and 138 to the relief output 52 of the switch over block 22, and thence through the relief line 54 and the pressure limiting unit 23.

When the hydraulic transducer 12 is fully charged, an applicable signal is transmitted to the computer 25, which for its part, transmits control signals to the two 3/2-way valves 65 and 85 so as to set them back into positions in which the shut-off valves 64 and 84 are again place d under pressure and thus into the turned off setting. If after the foregoing, the braking of the motor vehicle is not yet completed, it is then possible for the hydraulic transducer 16, connected with the other valves of the switch-over block 22, arranged in the circuit in the same manner, to operate as a hydrostatic retarder brake. In this case, the hydraulic transducer 16 pumps the oil in the circuit from the input 33 through the parts of the switch-over block circuit 22 which are still open, and through the pressure limiting unit 23 and the heat exchanger 175 (which is now operative) back to the control input. In the event that the operation of the hydraulic transducer 16 as a retarder is no longer necessary, then its connection with the drive train 8 of the motor vehicle is interrupted by declutching the clutch 13.

Figure 4:
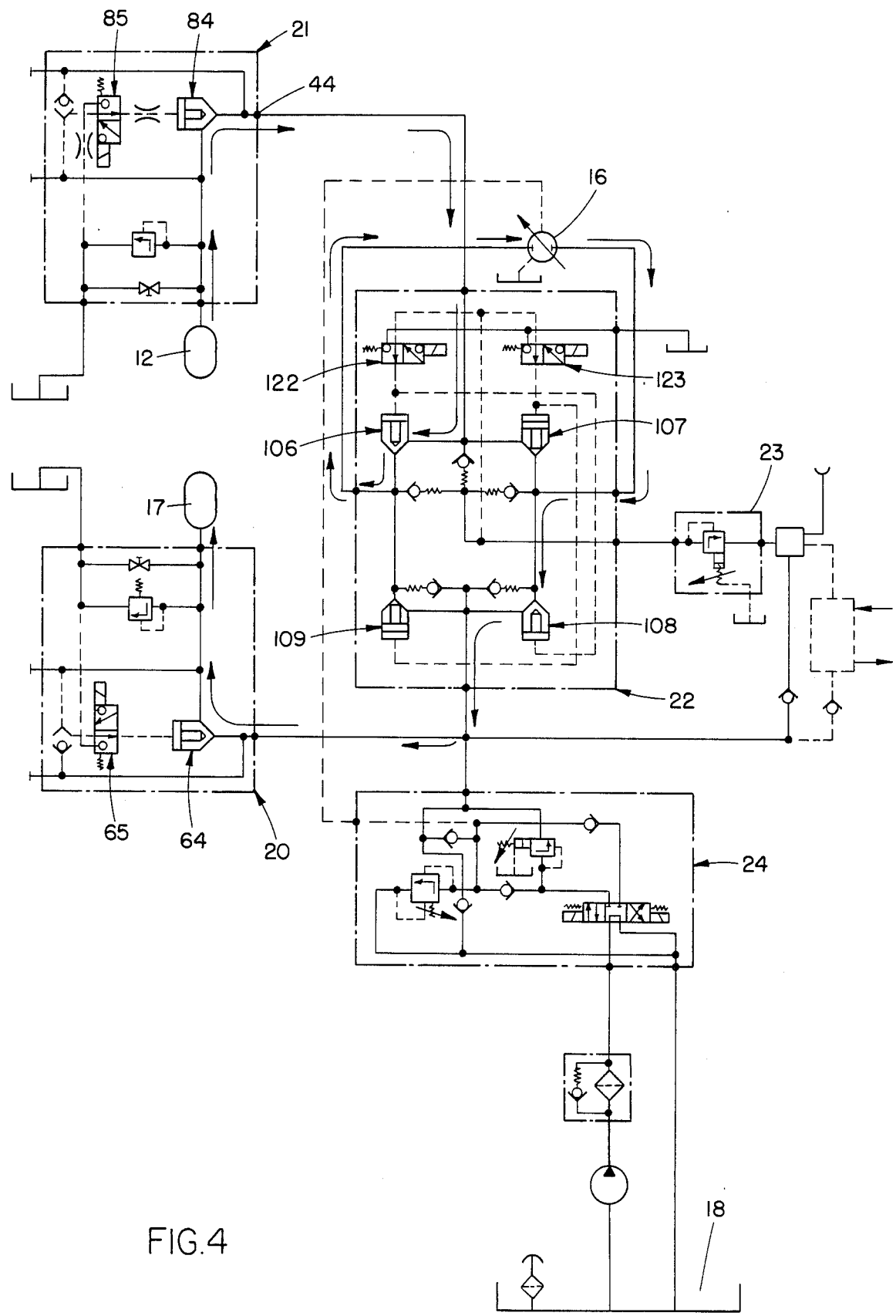
FIG. 4 illustrates the circuit FIG. 2 in a condition in which the components are switched to "starting and accelerating using stored energy"

Referring now to FIG. 4, there is described the operation "starting and acceleration of the motor vehicle using stored energy". When the computer 25 receives a signal indicating that the accelerator pedal 11 is being operated to start driving of the motor vehicle, and there is a sufficient amount of energy stored in the high pressure accumulator 12, then in the embodiment of FIGS. 1 through 7, the first step is for the 3/2-way valves 122 and 123 in the switch-over block 22 to be set such that the pressure spaces of hereto shut-off valves 106 and 108 operated by the 3/2-way valve 122, are depressurized and the latter are thus opened, while the pressure spaces of the two shut-off valves 107 and 109, operated by the 3/2-way valve 123, are pressurized and the valves 107 and 109 are closed. In the embodiment of FIGS. 8 and 9, the operation is different inasfar as an applicable signal for modification of the angle of rock or setting is transmitted to the appropriate means in the hydraulic transducer 16. After this operation, the shut-off valve 84 is opened by suitable operation of the 3/2-way valve 85 in the control block 21, and an opening of the shut-off valve 64 effected by suitable operation of the 3/2-way valve 65 in the control block 20. After closing of the clutch 13 by a respective control signal from the computer 25 and corresponding switch-over of the hydraulic transducer 16, the latter will now be in the position o operating as a motor and converting the potential energy released by the hydraulic transducer 12 and supplied thereto through the circuit oaths (which have now been opened up), into kinetic energy for driving the motor vehicle, such energy being supplied through the variable speed transmission 6 to the rear axle power train 8 of the vehicle. Simultaneously with this occurrence, the low pressure accumulator 17 is again charged up to a given rated pressure through a set of connections which are opened up in the switch-over block. The flow of oil taking place during the operations described hereinabove is indicated by arrows in FIG. 4.

Assuming that the high pressure accumulator 12 has been completely filled prior to the discharging operation, then due to the energy provided by the high pressure accumulator 12 during the discharging operation and converted by the hydraulic transducer 16, it will be possible for the motor vehicle to be started in drive and accelerated to a speed of up to about 40 to 50 km per hour without the aid of the internal combustion engine. It will be apparent from this that the braking energy recovery means in accordance with th invention only requires the internal combustion engine power at a relatively late point in time, and then essentially within a speed range which has been reached by power from the accumulator, this representing a very considerable savings in fuel and thus in the costs of operating the motor vehicle.

Figure 5:
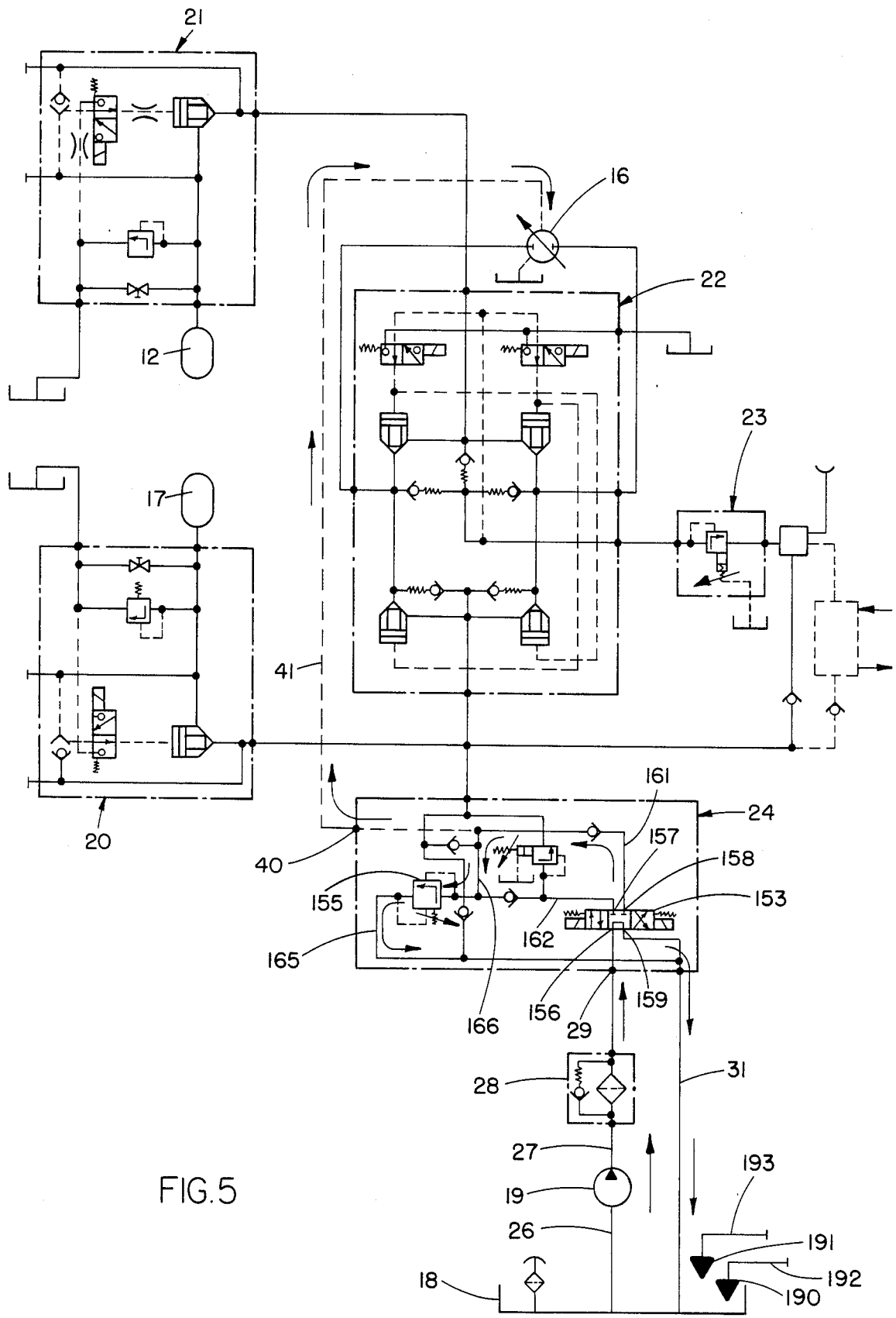
FIG. 5 illustrates the circuit of FIG. 2 with entries clarifying a first function of the oil feed block.
Figure 6:
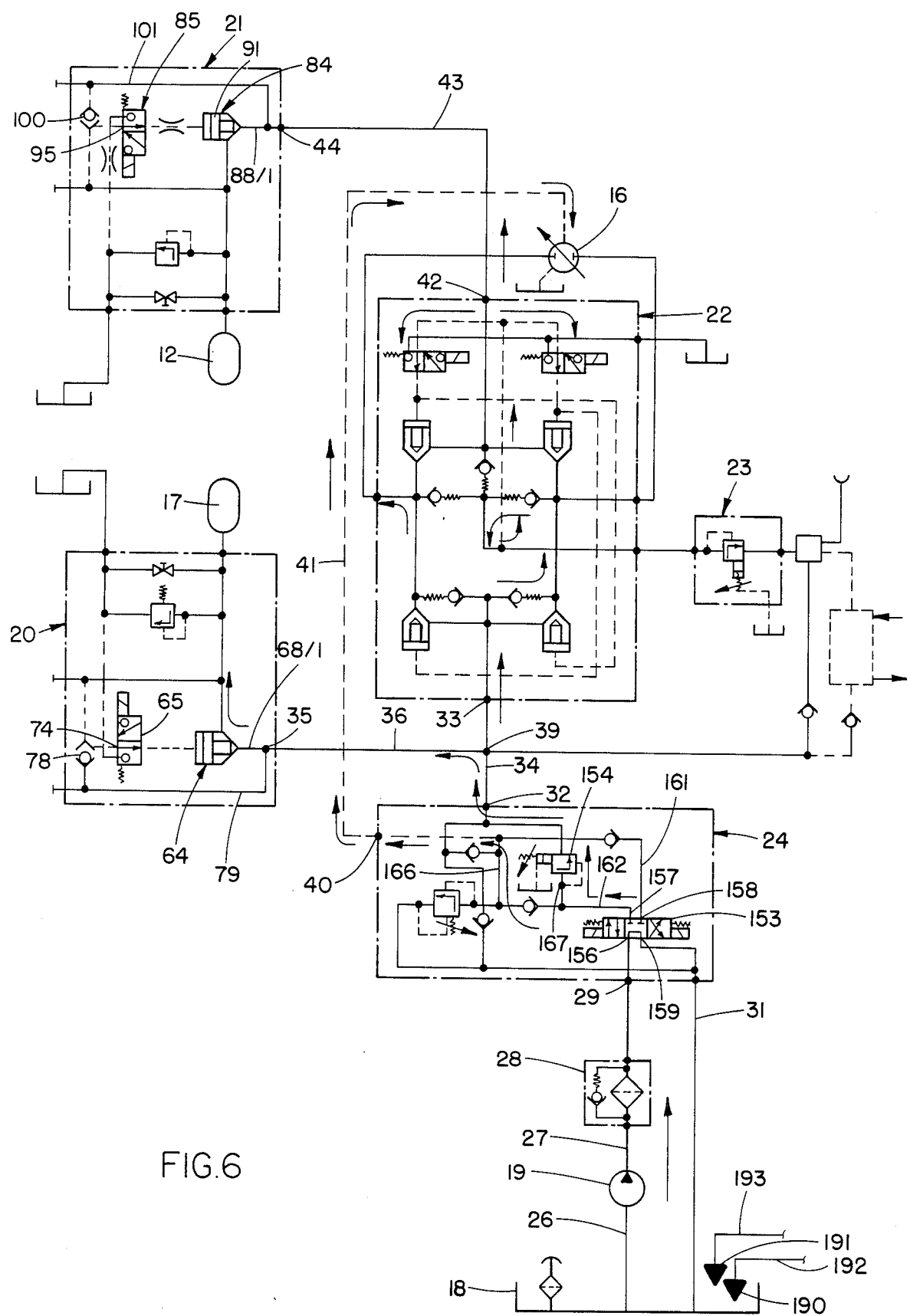
FIG. 6 illustrates the circuit of FIG. 2 with entries clarifying a second function of the oil feed block.
Figure 7:
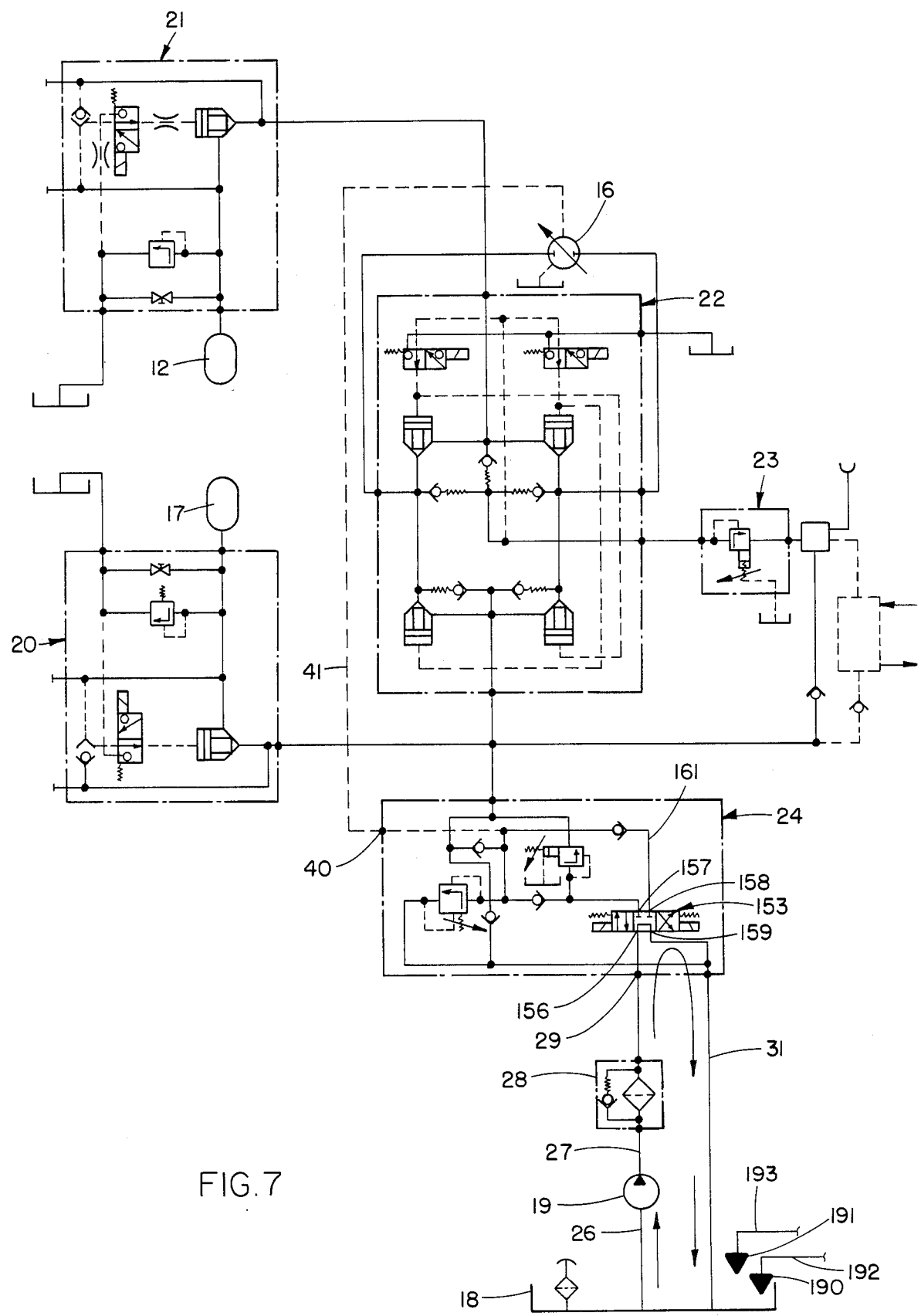
FIG. 7 illustrates the circuit of FIG. 2 with entries clarifying a third function of the oil feed block.

The following description on the basis of FIGS. 5 through 7 relates to the three functions of the oil feed block 24. Each of the three functions is characterized by a respective setting of the 4/3-way valve 153. It is to be noted that FIGS. 5 through 7 only include those reference numerals which are needed for an understanding of the invention and that some reference numerals have been omitted for purposes of clarity.

The first function of the oil feed block 24 is to ensure that there is a sufficient setting pressure in the hydraulic transducer 16 for setting the rock angle. For this purpose, the 4/3-way valve 153 is moved in response to an appropriate control signal from the computer 25 into a position in which the input port 156 is connected with the second pressure output port 158 so that hydraulic oil may be pumped through the internal line 161 of the oil feed block and through the external pressure line 41, connected with the control output 40, to the setting means of the hydraulic transducer 16. This pumping of liquid is indicated in FIG. 5 by arrows. As soon as a pressure has been generated in the pumping path as indicated, such pressure exceeding the pressure set by the low pressure limiting valve 155, the hydraulic oil pumped through the line 161 will be directed away through the line 166 and the part of the line 162 downstream from the check valve, through the low pressure limiting valve 155 and the line 165 line initially connecting the same, and through the return line 31 back to the hydraulic oil tank 18. This control path is also indicated in FIG. 5 by respective arrows.

A description is now provided on the basis of FIG. 6 pertaining to the second function of the oil feed block 24. It is to be preliminarily noted that all oil leaking from the hydraulic elements in the blocks 20, 21, 23 and 34 is returned to the hydraulic oil tank 18. If the level of oil of the tank rises more than a certain amount, as will be detected by a maximum level pickup 191 so that the computer 25 will receive a signal through the data line 193, the computer will transmit a control signal to the 4/3-way control valve 153 so that the latter will be set whereby its input port 156 is connected with the first pressure output port 157. In this setting, the oil feed block 24 will be able to recompense for any oil lost in lines outside the block caused by leakage, and furthermore ensure that the required operating or setting pressure is maintained in the hydraulic transducer 16. While this is effected, hydraulic oil will be pumped by the pump 19 through the opened path 156 and 157 in the 4/3-way valve 153 into the connected line 162. Hence, the oil needed to offset losses in the system of lines will flow through the feed line 167 branching off upstream of the check valve and the pressure turn-on valve 154 to the oil feed output 32 of the oil feed block 24 and thence to the function-specific blocks. Through the line 36, for example, the supplied hydraulic oil will flow to the control block 20, and in the latter will flow through the feed line 79 branching off upstream from the line part 68/1 and the change over valve 78 to the pressure input port 74 of the 3/2-way valve 65 so as to ensure that there is a sufficient pressure at the connected shut-off valve 64. Oil also passes through the input 33 into the switch-over block 22, in which the two 3/2-way valves 122 and 123 may be so operated by appropriate signals from the computer 25 that the pressure spaces of all connected shut-off valves 106, 107, 108 and 109 are either relieved of pressure or are pressurized. In order to ensure a sufficient operating pressure in the hydraulic transducer 16, there is provided an internal arrangement in the feed block involving the portion of the line 162 downstream from the check valve and line 166 branching off therefrom and the portion, downstream of the check valve, of the line 161 to the control output 40 of the oil feed block 24 and thence through the external operating pressure line 41. This pumping path is also marked in FIG. 6.

Finally, FIG. 7 shows the third function of the oil feed block 24 in which the 4/3-way valve 153 is, in fact, shown in the position in which the input port 156 is bypassed by the discharge port 159 so that the oil pumped by the pump 19 is conveyed back directly into the hydraulic tank 18. This function of the oil feed block is necessary in all cases in which the brake energy recovery system is disconnected from the drive train of the motor vehicle. This short-circuited or bypassing manner of operation of the oil feed block 24 is also indicated by arrows in FIG. 7.

As has been already explained, the entire brake energy recovery system is of a modular design. This provides advantages with regard to manufacture and the functionally related mutual placement of the modules, and their convenient arrangement on the motor vehicle. There are also advantages concerning the placement of the lines, especially in order to render it possible for a defective module and its lines to be replaced in a rapid manner.

The clutch 13 is preferably integrated in the housing of the variable speed transmission 6. The hydraulic transducer 16 is preferably attached directly adjacent thereto on the housing of the variable speed transmission 6. This arrangement of the two components 13 and 16 of the brake energy recovery system economizes in space and is functionally very efficient due to the short power transmission paths.

I claim:

1. A motor vehicle including a drive arrangement for a rear axle, said drive arrangement comprising an internal combustion engine and an automated switchable drive including a primary power output, a rear axle drive train connected to said output, and a secondary power output having a drive axle of a hydraulic transducer connectable thereto through a switch coupling, an element displaceable through an angle $\geq 0$ for adjusting the feed output of said hydraulic transducer, and which transducer forms the energy-transmitting portion of a brake energy recovery system and having two operative connections, a switch-over block having connections each respectively connected with one of said operative connections, said switch-over block at a constant remaining direction of rotation of the hydraulic transducer reversing the flow direction of hydraulic oil between a high pressure hydraulic accumulator and a low pressure hydraulic accumulator, each of said accumulators being respectively connected with a further connection of the switch-over block, and a control block being connected in each of at least two connecting lines communicating with said further connections, said two control blocks serving for the control of charging and discharging and shut-off sequences of the associated accumulator such that said switch coupling is actuatable only during certain travel operating conditions of the brake energy recovery system through connection of the hydraulic transducer to the drive train, in which instance the hydraulic transducer during the braking operation of the vehicle acts as a pump to convey hydraulic oil from the low pressure hydraulic accumulator through the switch-over block to the high pressure hydraulic accumulator, during starting and acceleration of the vehicle through discharging of the high pressure hydraulic accumulator to the low pressure hydraulic accumulator operating as a motor to transmit power to the drive train, said switch-over block including four shut-off valves which are switched hydraulically in pairs through an electromagnetically actuatable and electronically controlled 3/2-way valve connected in a hydraulic control circuit, all passageways in said four shut-off valves being connected through internal lines with relief valves arranged therein to a common output and to a pressure-limiting unit, and are connected through further internal lines in pairs with a predetermined one of said connections, a hydraulic oil tank and a displacement feed pump having an oil supply block connected to the output thereof for supplying sufficient oil pressure and quantity in the system and for the setting of the hydraulic transducer, and a computer utilized with a program which on the basis of sensors supplying actual values as to the operating condition controls for each sensor an applicable signal transmission to electrical actuating elements of the switch coupling and to the therewith connected portions of the brake energy recovery system for correspondingly necessary charging and discharging operations of the high pressure hydraulic accumulator.

2. A motor vehicle as claimed in claim 1, wherein said switch coupling is arranged within a housing for said automatically switchable drive and said hydraulic transducer is fastened on the exterior of said housing.

3. A motor vehicle as claimed in claim 1, wherein said two control blocks, said oil supply block and said switch-over block are each constructed for an operational structural grouping respectively forming a module, said modules being operatively interconnected through said hydraulic connecting lines.

4. A motor vehicle as claimed in claim 3, wherein the control block which is connected with the low pressure hydraulic accumulator includes a hydraulically controlled through shut-off valve with a 3/2-way valve which is electromagnetically actuatable and controlled by commands from said computer, and which is connected in a hydraulic control circuit internally of said control block, a pressure limiting valve and a shut-off choke, wherein with a closure element of said through shut-off valve, a line leading through the passageway and extending between the input and output of the control block is actuatable for effectuating the charging and discharging sequences of the low pressure hydraulic accumulator which is connected to the output through a supply line, said pressure limiting valve being connected in a line which branches from the portion of said line downstream of said shut-off valve and which connects into a venting line which branches off at the venting output of the 3/2-way valve and leads to the venting output of the control block which is in connection through a venting line with said hydraulic oil tank, wherein said choke is connected in parallel with said pressure limiting valve.

5. A motor vehicle as claimed in claim 4, wherein the hydraulic control circuit within said control block is formed from a plurality of line portions, of which one portion is a feed line branching from said portion of said branch line downstream of said shut-off valve and leading to an input of a changeover valve, a branch line being connected to the input thereof which branches from the portion of the line upstream of said shut-off valve, and wherein the output of the changeover valve is connected through a branch line with the pressure input connection of said 3/2-way valve, output connection of the latter being connected through a connecting line with the pressure chamber of said shut-off valve.

6. A motor vehicle as claimed in claim 3, wherein the control block which is connected with the high pressure hydraulic accumulator includes a hydraulically controlled shut-off valve with a 3/2-way valve connected an associated hdyraulic control circuit internally of the control block, which is electromagnetically actuatable and controlled by commands from said computer, said valve including a pressure limiting valve and a shut-off choke, wherein with the closure element of said through shut-off valve, a line leading through the passageway and extending between the input and output of the control block is actuatable for effectuating the charging and discharging sequences of the low pressure hydraulic accumulator which is connected to the output through a supply line, said pressure limiting valve being connected in a line which branches from the portion of said line downstream of said shut-off valve and which connects into a venting line which branches off at the venting output of the 3/2-way valve and leads to the venting output of the control block which is in connection through a venting line with said hyraulic oil tank, wherein said choke is connected in parallel with said pressure limiting valve.

7. A motor vehicle as claimed in claim 1, wherein each of the four shut-off valves in said switch-over block have a pressure space associated therewith, two of said pressure spaces in connection with the output connection of one of said two 3/2-way valves.

8. A motor vehicle as claimed in claim 7, wherein respectively the inlets of the two said shut-off valves connected to said first 3/2-way valve and which are blockable through closure elements thereof, and are respectively connected to an inlet of one of the two other shut-off valves which are blockablke through closure elements thereof connected to said second 3/2-way valve through respectively a line, wherein one of said lines is in connection through a branching feed line with the first operative connection of the hydraulic transducer and the second of said lines through a branching feed line in connection with the second operative connection of said hydraulic transducer.

9. A motor vehicle as claimed in claim 3, wherein the two passageways of said two shut-off valves connected to the first 3/2-way valve are each connected through a line with a passageway of one of the two other said shut-off valves connected to said second 3/2-way valve, wherein one of said two lines is in connection through a branching feed line with the blockable inlet of the shut-off valve in said control block towards the high pressure accumulator and wherein said other of said two lines is connected through a branching feed line with the blockable inlet of the shut-off valve in said control block towards the low pressure accumulator.

10. A motor vehicle as claimed in claim 3, wherein said oil supply block includes an input which is connected through a feed line with said displacement pump aspirating oil from said hydraulic oil tank, said oil supply block comprising three outputs including a discharing output which is in connection through a return line with said hydraulic oil tank, a control output having the pivot angle setting arrangement for said hydraulic transducer connected thereto through a control pressure line, and an oil supply output having said control block and said switch-over block connected thereto towards the los pressure accumulator, and wherein the oil supply block includes a 4/3-way valve controllable from said computer, the inlet connection of said valve with the input of the oil supply block and the discharge outlet being connected through a passageway with said hydraulic oil tank, whereas through the first pressure output connection of said 4/3-way valve oil is deliverable through a line and a pressure supply valve to said oil supply output of the oil supply block, and oil at high pressure is dischargeable through a low pressure limiting valve to said discharge output of the oil supply block, wherein at the second pressure output connection of said 4/3-way valve a line connects said control output of the oil supply block, from which oil is dischargeable under high pressure through a branch line and through said low pressure limiting valve to said discharging output of the oil supply block, wherein return flows of oil are prevented in said lines through non-return valves arranged therein.

\* \* \* \* \*